（12）United States Patent
Santelli, Jr.

(10) Patent No.: US 11,603,454 B2
(45) Date of Patent: Mar. 14, 2023

(54) STATIC DISCHARGING DRYER DISK

(71) Applicant: Albert Santelli, Jr., Martinsville, NJ (US)

(72) Inventor: Albert Santelli, Jr., Martinsville, NJ (US)

( * ) Notice: Subject to any disclaimer, the term of this patent is extended or adjusted under 35 U.S.C. 154(b) by 106 days.

(21) Appl. No.: 16/801,665

(22) Filed: Feb. 26, 2020

(65) Prior Publication Data

US 2021/0261763 A1    Aug. 26, 2021

(51) Int. Cl.
    *C08L 23/12*    (2006.01)
    *C08K 3/04*     (2006.01)
    *C08J 7/044*    (2020.01)
    *D06F 58/20*    (2006.01)
    *C08K 7/06*     (2006.01)

(52) U.S. Cl.
    CPC ............... *C08L 23/12* (2013.01); *C08J 7/044* (2020.01); *C08K 3/04* (2013.01); *C08K 7/06* (2013.01); *D06F 58/203* (2013.01); *C08K 2201/001* (2013.01)

(58) Field of Classification Search
    CPC ... C08J 7/044; C08K 3/04; C08K 7/06; C08K 2201/001; C08L 23/12; D06F 58/203
    See application file for complete search history.

(56) References Cited

U.S. PATENT DOCUMENTS

| 3,944,694 | A | * | 3/1976 | McQueary | D06M 23/00 428/137 |
| 4,891,264 | A | * | 1/1990 | Daimon | H01B 1/22 442/187 |
| 5,368,913 | A | * | 11/1994 | Ortega | D04H 1/4242 428/198 |
| 7,871,975 | B2 | | 1/2011 | Tindel-Koukal et al. | |
| 9,267,229 | B2 | | 2/2016 | Oh et al. | |
| 9,901,018 | B1 | * | 2/2018 | Richmond | H01R 13/6599 |
| 2012/0204444 | A1 | * | 8/2012 | Liu | A43B 7/144 36/44 |
| 2014/0295163 | A1 | * | 10/2014 | Kohsaka | B29C 51/12 428/220 |

* cited by examiner

*Primary Examiner* — James C Goloboy
(74) *Attorney, Agent, or Firm* — Porzio Bromberg & Newman P.C.

(57) ABSTRACT

A static discharge device is formed of an electrical conductor to dissipate static charge from materials including fabrics, clothing and hair. The static discharge device can be used in a clothes dryer. Electrons can migrate to the electrical conductor to dissipate the static charge from materials. The static discharge device can be formed of a conductive thermoplastic material including a polymer and strands of metal or carbon.

19 Claims, 10 Drawing Sheets

STATIC DISCHARGING DRYER DISK

BACKGROUND OF THE INVENTION

Field of the Invention

The present invention is directed to a static discharge device in which a static discharge dryer disc removes static charge from a surface.

Description of Related Art

Static electricity is the concentration of electrical charges on the surface of a non-conducting material. Electrostatic discharge (ESD) occurs when a non-conducting surface is rubbed against another and the contacted surfaces are then parted. As clothes tumble in the dryer, pieces of fabric rub together transferring electrons from one surface to another. This results in the build-up of a low-level electrical charge of static electricity on the pieces of fabric. Conventional fabric softeners have been used to remove static from fabrics by coating fabrics in a light layer of wax, effectively reducing the friction between different materials.

U.S. Pat. No. 9,267,229 describes a dryer configured to remove static electricity during a drying process. The dryer includes a drum rotatable within a cabinet. The drum is configured to receive laundry. A steam generator generates and exhausts steam into the drum. A steam diffuser uniformly diffuses the steam within the drum. A ventilation system ventilates air within the drum. This patent has the drawback of being expensive to manufacture.

One type of dryer fabric softener is available as a dryer sheet. The dryer sheet is placed in the dryer along with wet laundry. The sheet is often a nonwoven fabric containing a solid composition that includes a fabric softener and a fragrance. During the drying cycle, the temperature increases as the laundry dries, causing the fabric softener to melt and transfer from the nonwoven sheet to the laundry. Dryer sheets are generally provided for a single use and provide limited anti-static characteristics. Some conventional dryer sheets include the following warning: Do not use this product: On children's sleepwear or garments labeled as flame resistant as it may reduce flame resistance. On garments made with fluffier fabrics containing cotton (such as fleece and terry cloth) as it may increase the flammability of these fabrics.

U.S. Pat. No. 7,871,975 describes a fabric treatment composition which includes a fabric treatment agent and a carrier component for containing the fabric treatment agent in a solid form during operation conditions in a dryer. The fabric treatment composition is constructed for transferring the composition to wet fabric as a result of solubilizing the fabric treatment composition by contacting the fabric treatment composition with the wet fabric during a drying operation in a dryer. A fabric treatment agent comprises a quaternary ammonium component and a silicone component. The composition can be provided in the form of a block for attachment to an interior wall of a dryer, in the form of a ball for free placement within a dryer, and in the form of a pellet, a tablet, or molded unit. In addition, the composition can be provided as a laminate to a fabric to provide a dryer sheet. A method for treating fabric in described which includes the steps of allowing fabric containing free water to contact the fabric treatment composition inside a dryer during a drying operation, and transferring the fabric treatment agent from the fabric treatment composition to the fabric as a result of solubilizing the fabric treatment agent with the free water in the fabric. The step of transferring the fabric treatment composition can substantially end when the fabric dries sufficiently to lose the free water. In addition, the rate of transfer of the fabric treatment composition can decrease as the fabric dries during the drying operation.

It is desirable to provide an improved device for removal of electrostatic discharge from materials which is free of chemical discharge, waxes and does not interfere with the properties of flame resistant materials.

SUMMARY OF THE INVENTION

The present invention relates to a static discharge device. In one embodiment, a static discharge disc is formed of an electrical conductor to dissipate static charge from fabrics in a clothes dryer. The fabrics can include clothing. Electrons can migrate to the electrical conductor to dissipate the static charge from fabrics before the static discharge accumulates to high levels preventing the build-up of an electric charge.

The static discharge device can be formed of a conductive thermoplastic material. In one embodiment, the static discharge device comprises a polymer including conductive strands. The polymer can be a low friction polymer. In one embodiment, the conductive strands can be blended into the polymer. The conductive strands can include stainless steel strands, carbon, carbon fiber or any conductive metal strands. In one embodiment the conductive strands are carbon fiber blended into a thermoplastic material.

A nonconductive coating can be applied to a surface of the conductive thermoplastic material. The nonconductive coating can be selected to have a very thin thickness in order to allow an electric charge to pass through the nonconductive coating to reach the conductive thermoplastic material. In an alternate embodiment, a dielectric coating can be applied to conductive thermoplastic material.

Alternatively, a conductive coating can be applied to the thermoplastic material or the conductive thermoplastic material. In one embodiment, the polymer is polypropylene (PP).

The static discharge disc can have a streamlined shape. For example, the static discharge disc can have an oval or circular shape. The low friction polymer and streamline shape of the static discharge device allows the static discharge device to slide freely throughout fabrics and clothing in a clothes dryer minimizing hang-ups and creating less friction between the static discharge device and the fabrics and/or clothing. The polymer base of the static discharge device allows the static discharge device to be light weight better impact resistance minimizing noise in the dryer and dryer wear.

In one embodiment, one or more of the static discharge devices can be placed in a clothes dryer before or after loading clothes into the clothes dryer. The one or more static discharge devices can be used during a drying cycle. After the drying cycle, the one or more static discharge devices can be removed from the dryer and re-used or discarded. For any residual static on fabrics or clothing after the drying cycle, the static discharge device can be moved along the entire surface of the item by holding the static discharge device at a pre-determined distance from the item. The discharge of static from the item can result in a snapping sound which is the static discharging from the item.

In one embodiment, the static discharge device can be used to control static on hair. In this embodiment, the static discharge device can be moved along the entire surface of the hair by holding the static discharge device at a predetermined distance from the hair to discharge static build up.

The static discharge device removes static by means of conductive properties and is not a chemical delivery system. The static discharge device removes and controls electrostatic discharge (ESD) while maintaining a chemical free environment. The static discharge device is free of waxes. The static discharge device does not leave any residue on the materials which are subject to static removal by the static discharge device. The static discharge device does not interfere with any properties of flame resistant materials which are used with the static discharge device. The static discharge device is safe for use on children's sleep wear and other garments labeled flame retardant.

In the present invention, static is eliminated from a material solely by discharging the static naturally to the static discharge device.

The invention will be more fully described by reference to the following drawings.

DETAILED DESCRIPTION

Figure 1A:
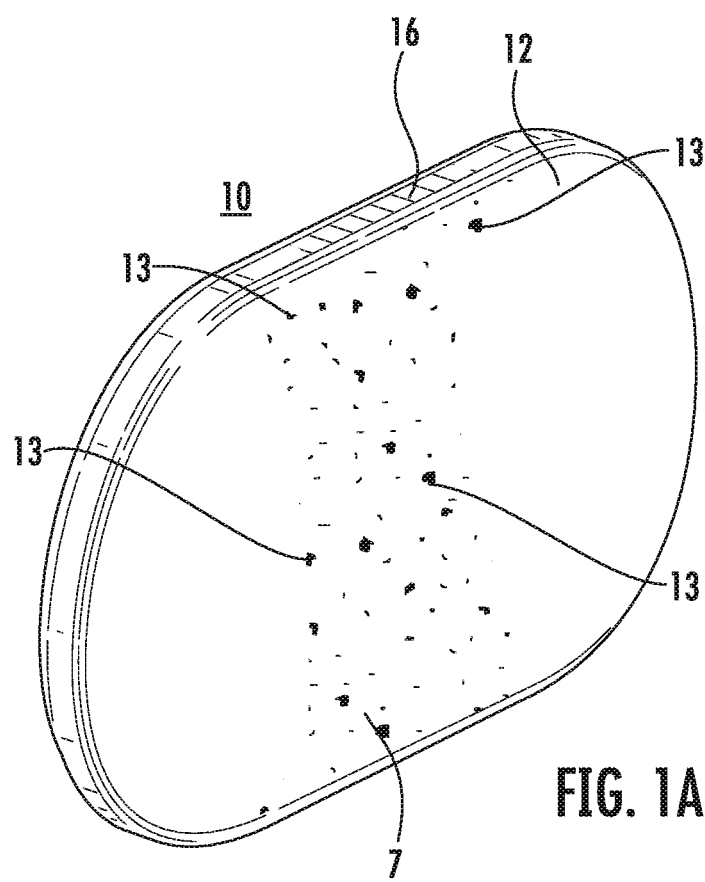
FIG. 1A is a perspective view of a static discharge device in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIGS. 1A-1D illustrate static discharge device 10 in accordance with the teachings of the present invention. Static discharge device 10 includes body 11. Body 11 can be formed of conductive thermoplastic material 12. In one embodiment, conductive thermoplastic material 12 comprises thermoplastic material 14 including conductor 13. In one embodiment, conductor 13 is metal particles or strands as shown in FIG. 1A.

Thermoplastic material 14 can comprise a polymer. In one embodiment, the polymer can be a low friction polymer. In one embodiment, conductor 13 can be blended into thermoplastic material 14. Suitable materials for conductor 13 include stainless steel strands, carbon, carbon fiber or any conductive metal strands. Conductor 13 can also be formed of carbon nanotubes. Suitable thermoplastic materials 14 include: polypropylene (PP); nylon; polycarbonate (PC); polystyrene (PS); styrene acrylonitrile (SAN); acrylonitrile butadiene styrene (ABS); high density polyethylene (HDPE); low density polyethylene (LDPE); acetal; polyacetal; polyoxymethylene (POM); polysulfone (PSU); polybutylene terephthalate (PBT); polyethylene terephthalate (PET); ester-based thermoplastic polyurethane elastomer (TPUR); ether-based thermoplastic polyurethane elastomer (TPUR); polyphenylene sulfide (PPS); polyethersulfone (PES); polyether-ester block copolymer thermoplastic Elastomer (TEEE:; modified polyphenylene oxide (PPO); acrylic; poly(methyl methacrylate) (PMMA); polycarbonate/acrylic alloy (PC/PMMA); polyetherimide (PEI); Polyolefin; polycarbonate/polyester (PC/PBT); polyetheretherketone (PEEK); polyetherketone (PEK); rigid thermoplastic polyurethane (RTPU); polycarbonate/ABS alloy (PC/ABS); styrenic block copolymer thermoplastic elastomer (SBC); thermoplastic vulcanizate (TPV); polymethylpentene (PMP); polyvinylidene fluoride (PVDF); fluorinated ethylene propylene (FEP); polyetherketoneetherketoneketone (PEKEKK); polyphthalamide (PPA); polyetherketoneketone (PEKK); thermoplastic polyimide (TPI); polysulfone/polycarbonate alloy (PSU/PC), high temperature nylon (HTN); polyketone (PK); syndiotactic polystyrene (SPS); thermoplastic polyolefin (TPO) and thermoplastic elastomer (TPE).

In one embodiment, conductive thermoplastic material 12. comprises thermoplastic material 14 formed of polypropylene (PP) and carbon fibers.

Figure 1B:
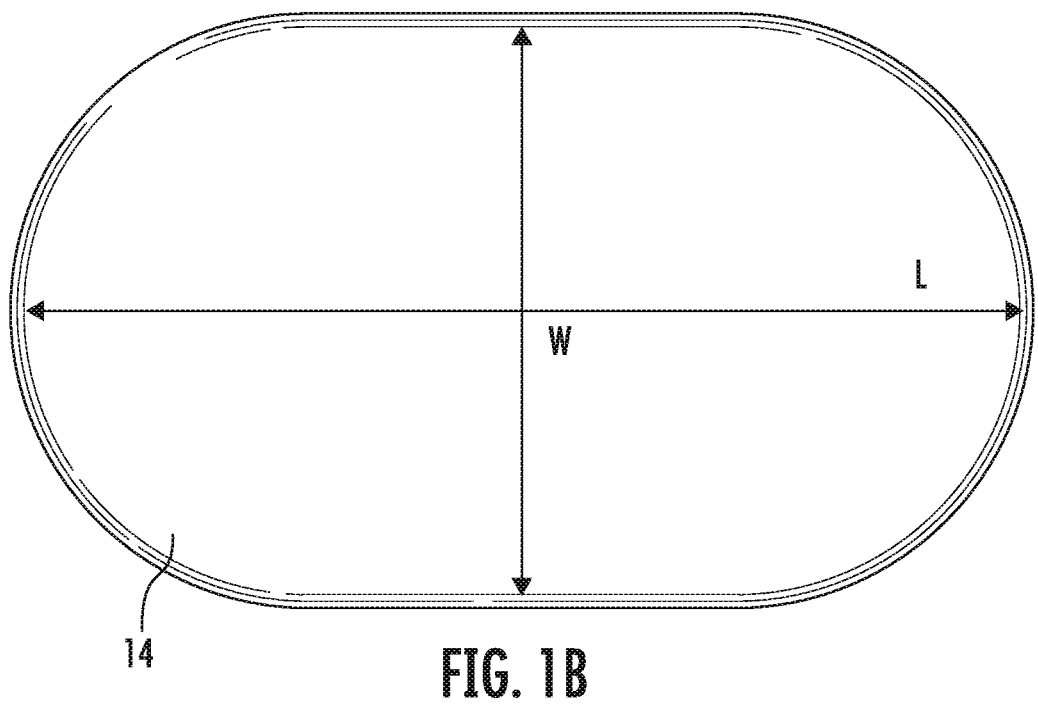
FIG. 1B is a front view of the static discharge device.
Figure 1C:
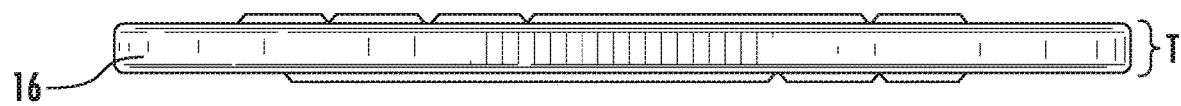
FIG. 1C is a side view of the static discharge device.
Figure 1D:
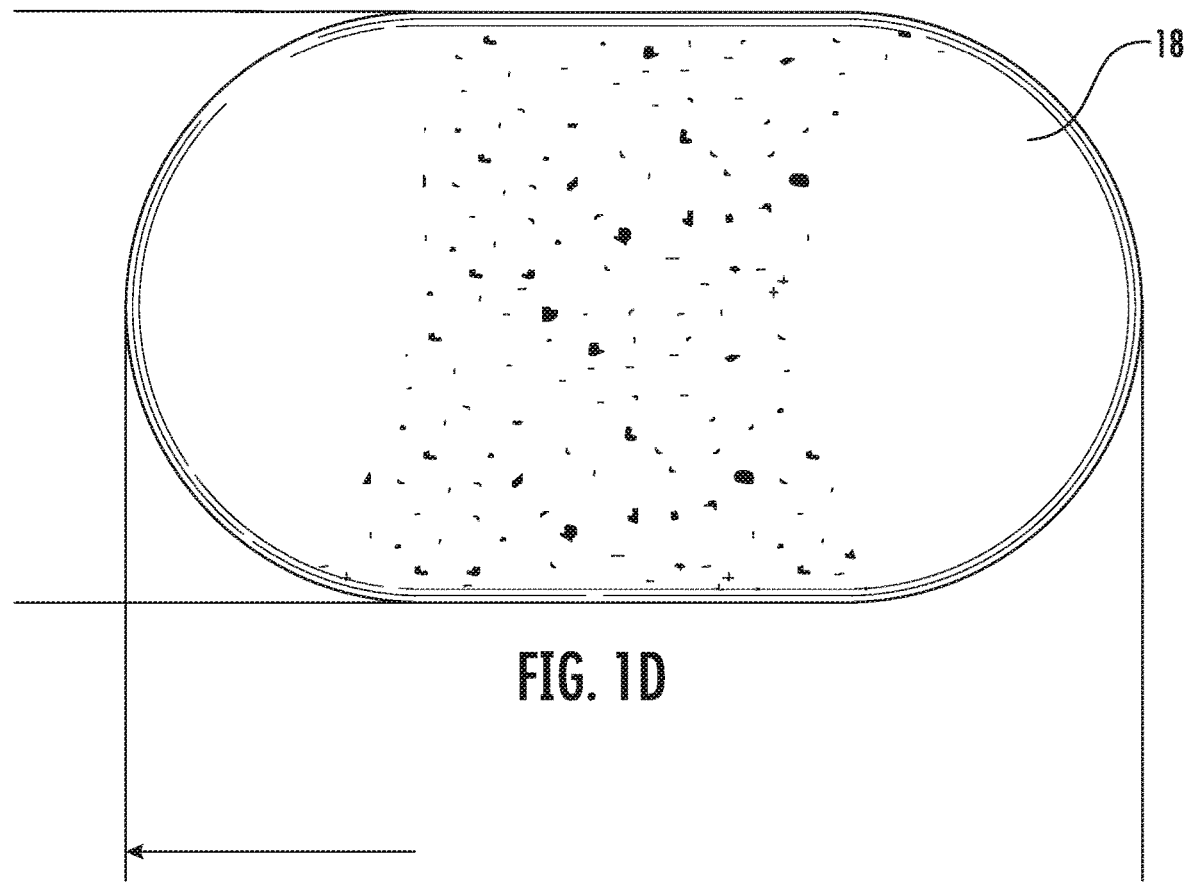
FIG. 1D is a rear view of the static discharge device.

Static discharge device 10 can have a streamline shape, as shown in FIGS. 1B-1D. Front 14 and rear 18 of static discharge device 10 can have a matching disc shape. Static discharge device 10 can have an oval or circular shape. For example, static discharge device 10 can have a width W and length L in the range of about 1 to about 6 inches, or a range of about 2 to about 4 inches or a range of about 3 to about 4 inches. Side 16 of static discharge device 10 can have a thickness T of about ¼ to about ½ inch. Front 14, side 16 and rear 18 can be integral to one another.

Figure 2A:
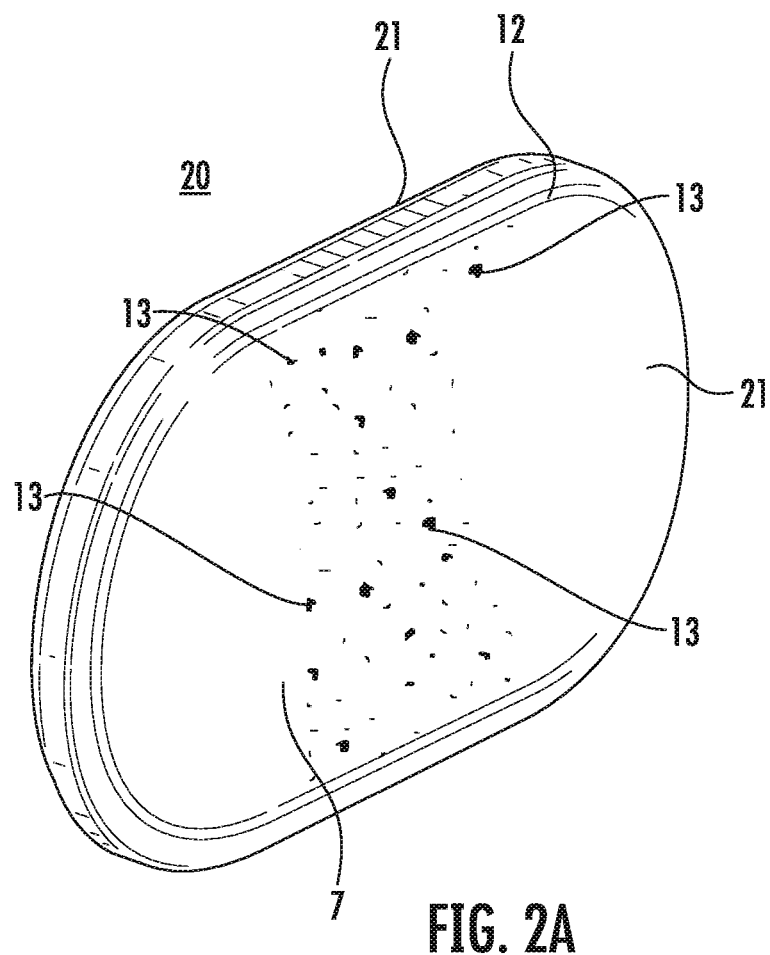
FIG. 2A is a perspective view of a static discharge device including a non-conductive coating.
Figure 2B:
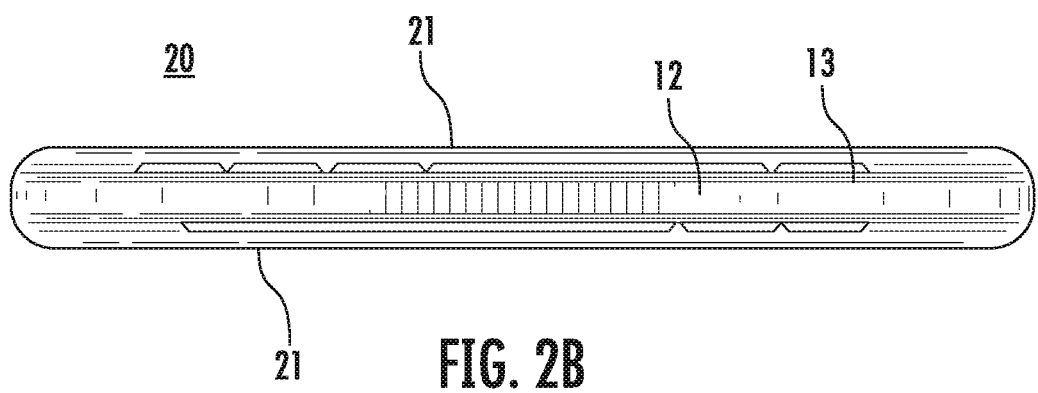
FIG. 2B is a side view of the static discharge device of FIG. 2A.

FIGS. 2A-2B illustrate static discharge device 20 including coating layer 21. Static discharge device 20 can be formed of conductive thermoplastic material 12. Coating layer 21 can comprise a non-conductive material. For example, coating layer 21 can comprise a non-conductive material of a polymer coating. Coating layer 21 can be selected to have a very thin thickness in order to allow an electric charge to pass through coating layer 21 to reach conductive thermoplastic material 12 of static discharge device 20. Coating layer 21 can be applied as micron or submicron layers. In one embodiment, coating layer 21 can have a thickness in the range from about 0.0001 to about 0.001 inches. For example, coating layer 21 can be applied by spraying, dipping, Co-molding, over molding, sputter coating, fiber surface treatment, vacuum metallization, chemical and electro-chemical polymerization.

Figure 3A:
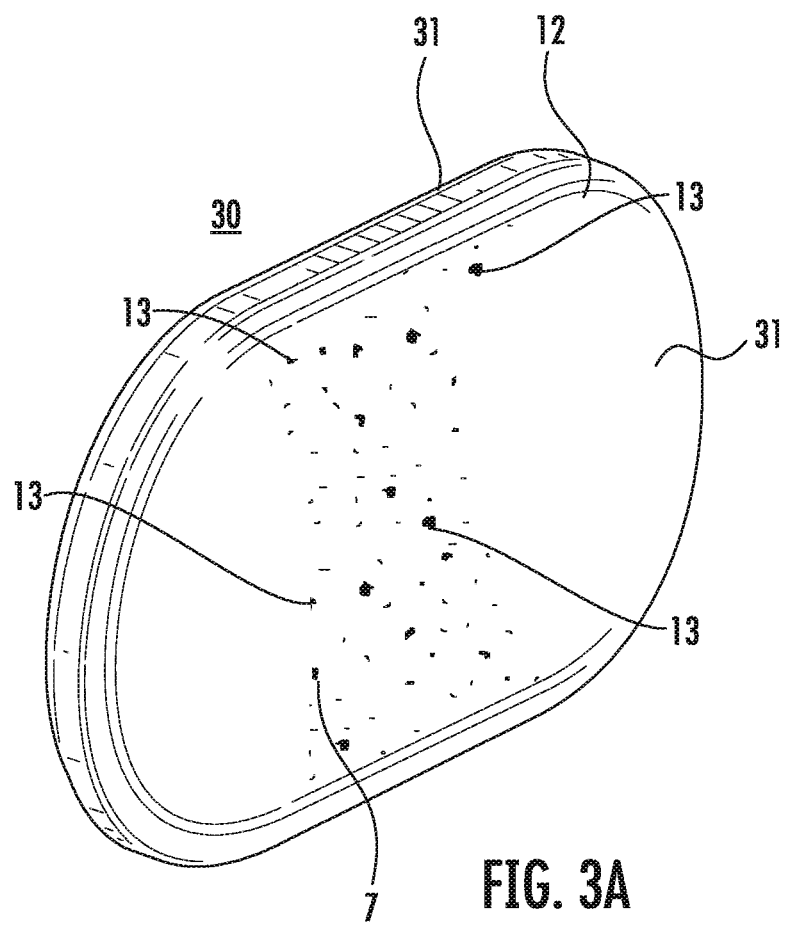
FIG. 3A is a perspective view of a static discharge device including a conductive coating.
Figure 3B:
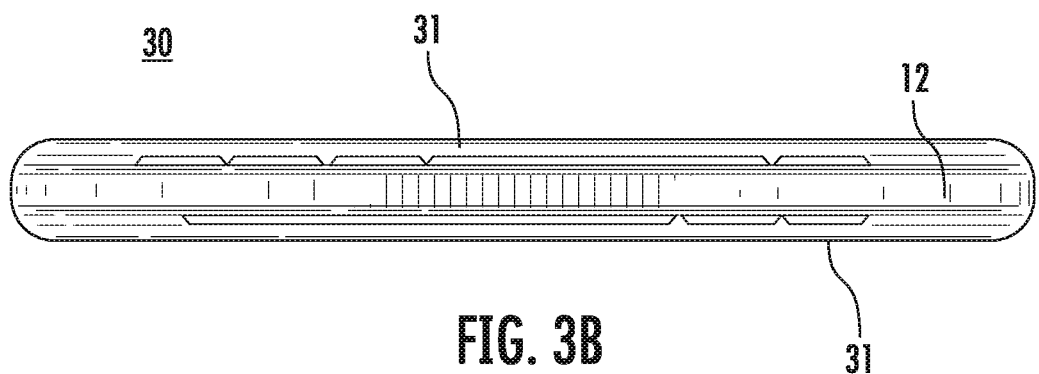
FIG. 3B is a side view of the static discharge device of FIG. 3A.

FIGS. 3A-3B illustrate static discharge device 30 including coating layer 31. Static discharge device 30 can be formed of conductive thermoplastic material 12. Coating layer 31 can comprise a conductive material. For example, coating layer 31 can comprise a polymer including a conductive material selected from metal, metal alloy, carbon and carbide matrix or any conductive material. Coating layer 31 can be applied as micron or submicron layers. In one embodiment, coating layer 21 can have a thickness in the range from about 0.0001 to about 0.001 inches. For example, For example, coating layer 31 can be applied by spraying, dipping, Co-molding, over molding, sputter coating, plating process, fiber surface treatment, vacuum metallization, chemical and electro-chemical polymerization.

Figure 4A:
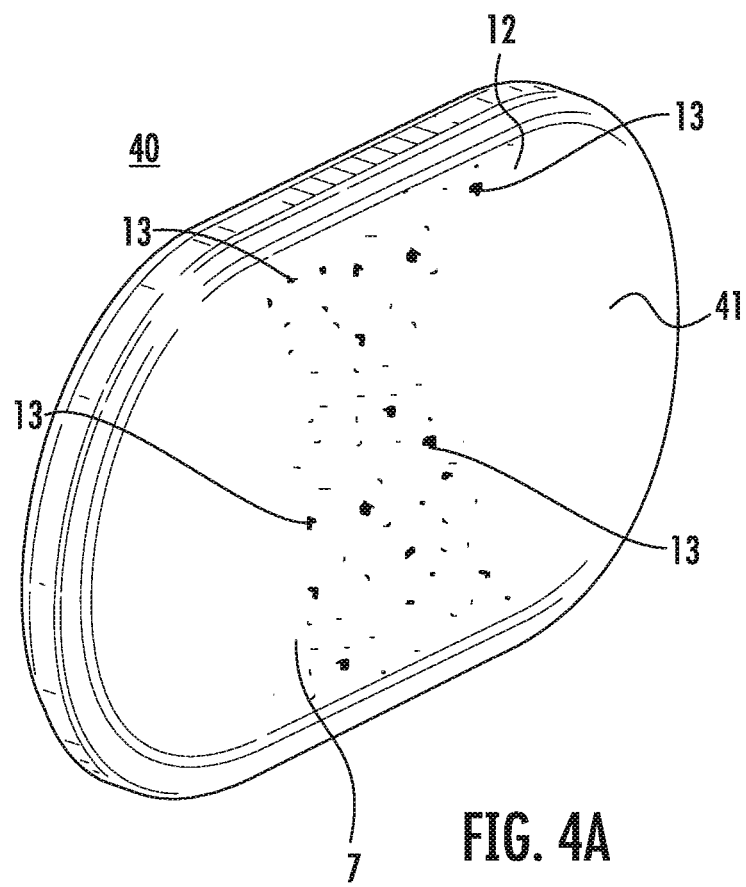
FIG. 4A is a perspective view of a static discharge device including a dielectric coating.
Figure 4B:
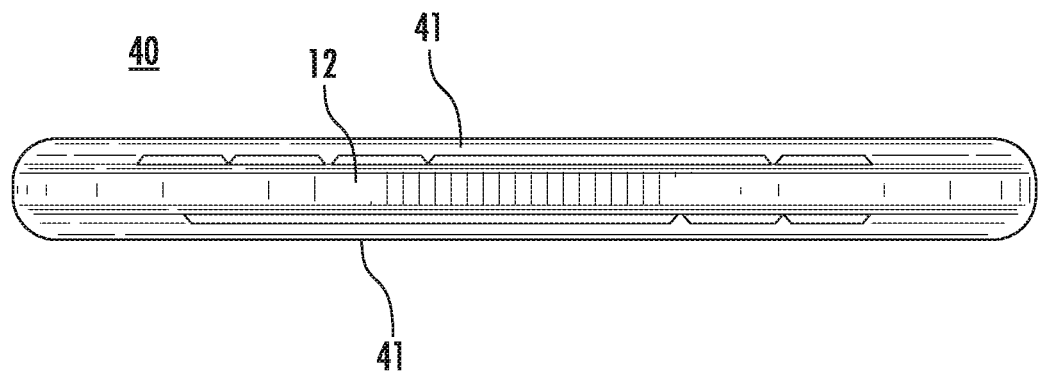
FIG. 4B is a side view of the static discharge device of FIG. 4A.

FIGS. 4A-4B illustrate static discharge device 40 including coating layer 41. Static discharge device 40 can be formed of conductive thermoplastic material 12. Coating layer 41 can comprise one or more layers of a dielectric material. For example, coating layer 41 can comprise a dielectric material selected from ceramic, mica, glass, plastics, and oxides of metals. Dielectric coating layer 41 can be applied by co-molding, over molding, dipping, spraying, sputter coating or a plating process containing metallic conductive properties. In alternate embodiments, dielectric coating layer 41 can be applied by electron beam deposition, ion-assisted deposition (IAD), ion beam splitting (IBS) and advanced plasma reactive sputtering (APRS). Coating layer 41 can be applied as micron or submicron layers. In one embodiment, coating layer 41 can have a thickness in the range from about 0.0001 to about 0.001 inches.

A method for manufacturing static discharge device 10 comprises blending conductor 13 into thermoplastic material 14 to form conductive thermoplastic material 12. The amount of conductor 13 blended into thermoplastic material 14 can be selected to provide desired properties including control of ESD, static discharge, surface resistivity or surface resistance. In one embodiment thermoplastic material 14 can comprise from about 0.1% to about 50% by weight or by volume of conductor 13, for example, about 1.0-40%, about 5-30%, about 10-20%, or about 10-15%. In one example, conductor 13 can be present in an amount of about 15% to provide surface resistivity of less than 1E6 ohm/sq. The thermoplastic material 14 can be present in an amount of for example about 50% to about 99.9% by weight or by volume, for example, about 60-99%, about 70-95%, about 80-90%, or about 85-90%.

Conductive thermoplastic material 12 is shaped into a predetermined shape for static discharge device 10. For example, static discharge device 10 can be extruded or formed by injection molding.

Figure 5:
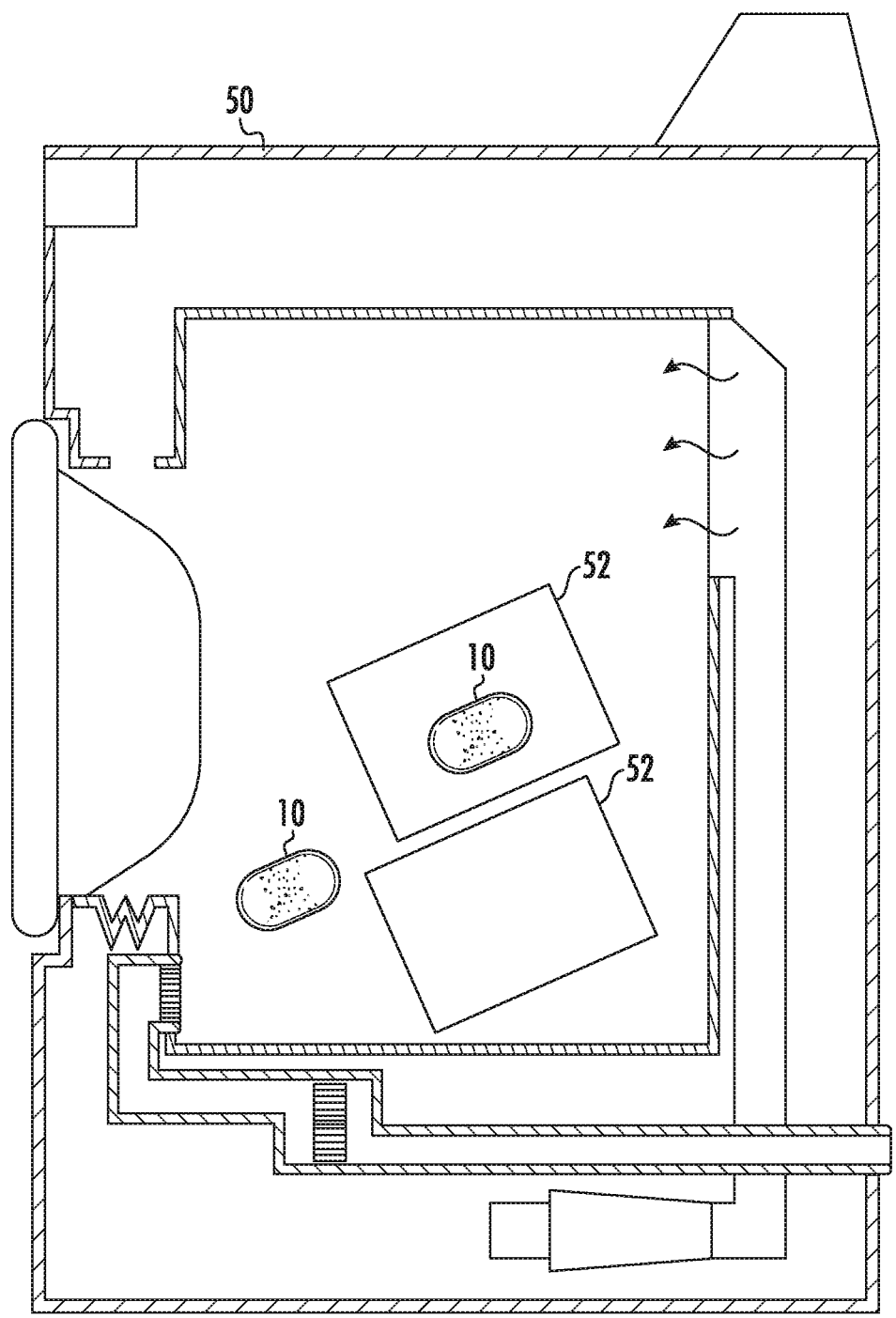
FIG. 5 is a schematic diagram of use of the static discharge device in a clothes dryer.

A method for removing static from one or more materials 52 comprises placing one or more static discharge devices 10 in clothes dryer 50 before or after loading the one or more materials 52 into clothes dryer 50 and tumbling the one or more static discharging devices 10 with one or more materials 22 during a drying cycle as shown in FIG. 5. After the drying cycle, the one or more static discharge devices 10 can be removed from clothes dryer 50 and re-used or discarded. Before re-use static discharge device 10 can be hand washed. The low friction polymer and streamlined shape of static discharge device 10 allows static discharge device 10 to slide freely throughout one or more materials 52 minimizing hang-ups and creating less friction between static discharge device 10 and one or more materials 52.

Clothes dryer 50 can be a conventional clothes dryer. For example material 52 can be fabric or clothing.

Figure 6:
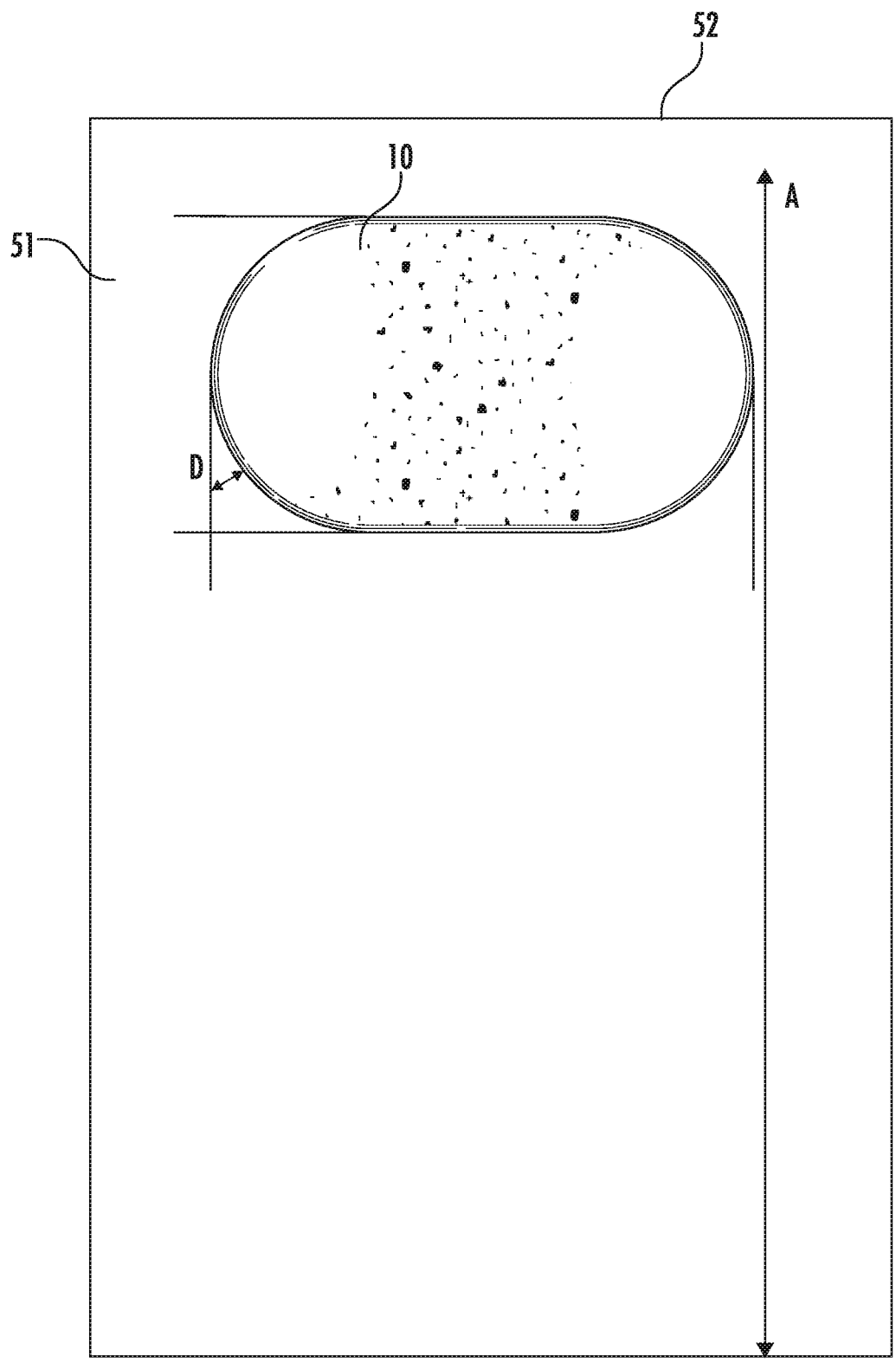
FIG. 6 is a schematic diagram of use of the static discharge device to remove static from a material.

For any residual static on material 52 after the drying cycle, static discharge device 10 can be moved along surface 51 of material 52 by holding static discharge device 10 at a pre-determined distance D from material 52 as shown in FIG. 6 and moving static discharge device 10 in the direction of arrow A. The discharge of static from the item can result in a snapping sound that is the static discharging from the item. The pre-determined distance D can be a distance at which a cracking or popping sound is heard as static is transferred to static discharge device 10. Static discharge device 10 can be moved up and down along material 52.

Figure 7:
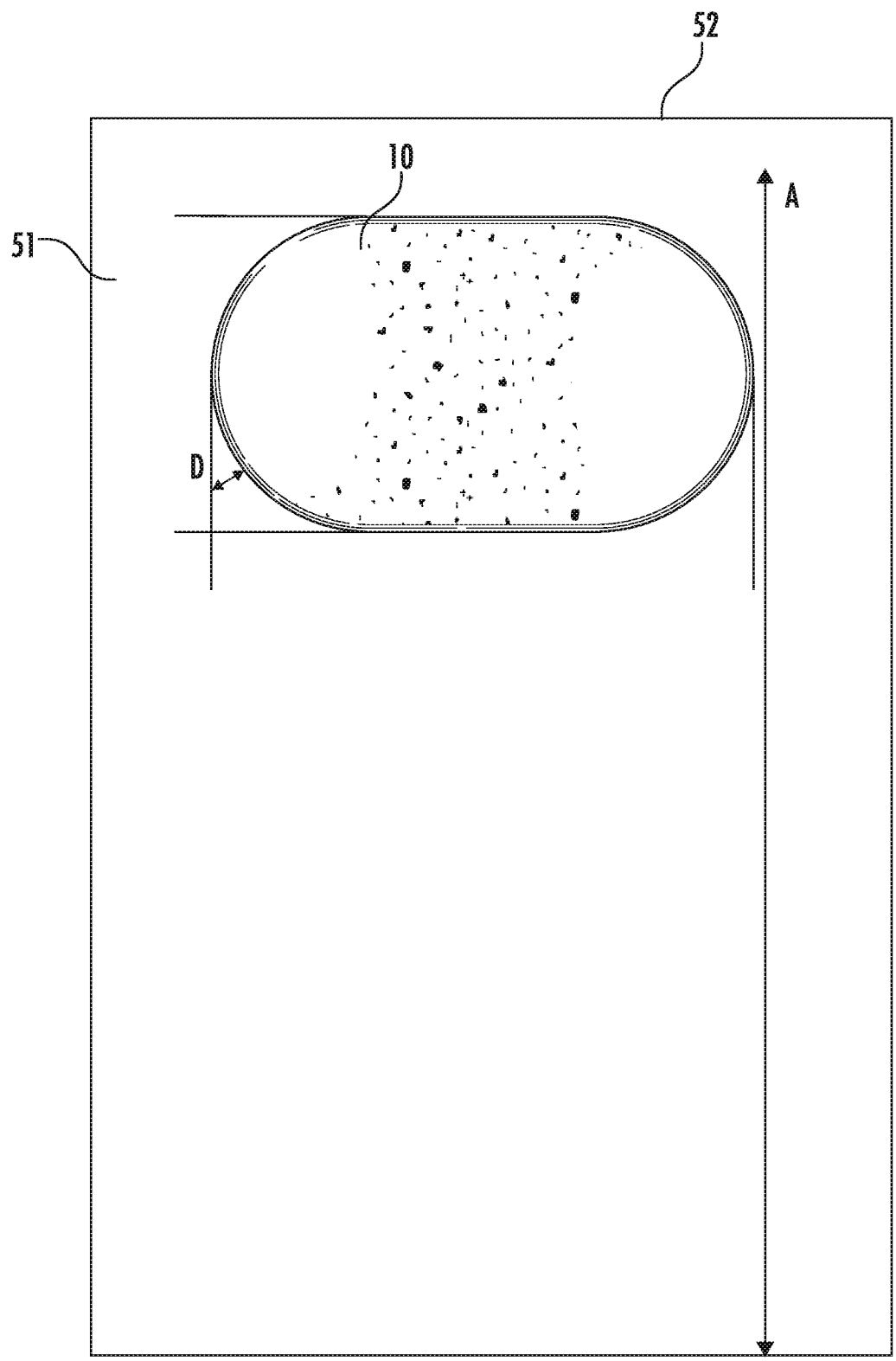
FIG. 7 is a schematic diagram of use of the static discharge device to remove static from a material.
Figure 8A:
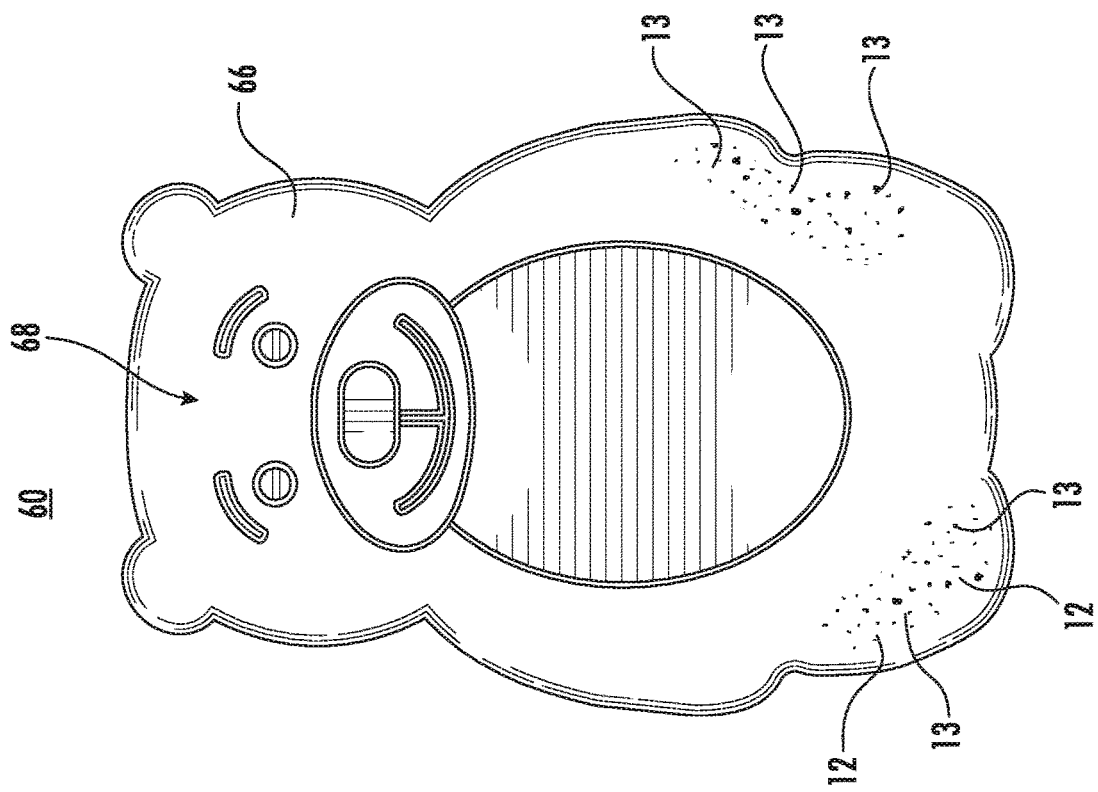
FIG. 8A is a perspective view of a static discharge device in accordance with the teachings of the present invention.
Figure 8B:
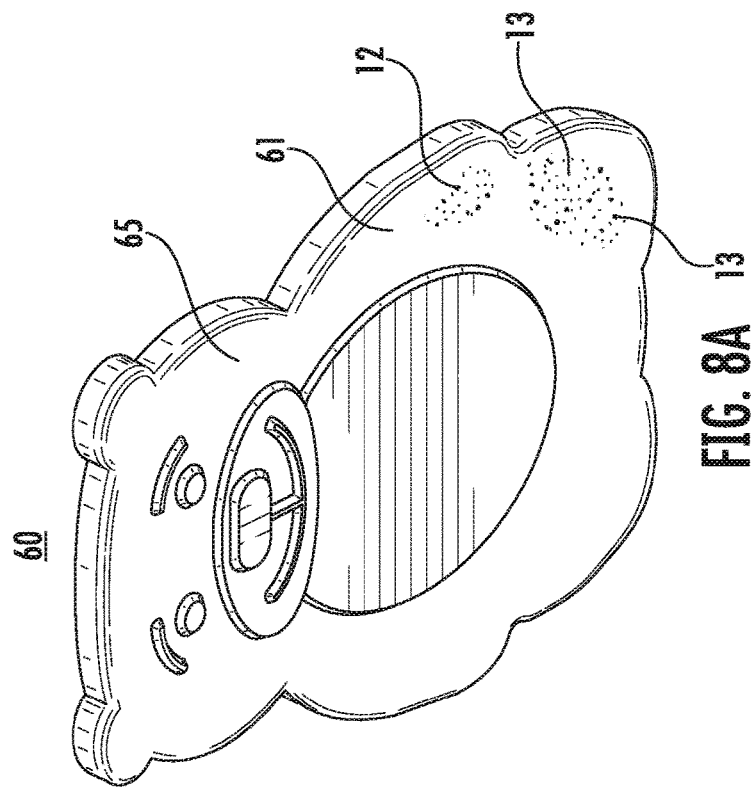
FIG. 8B is a front view of the static discharge device of FIG. 8A.
Figure 8D:
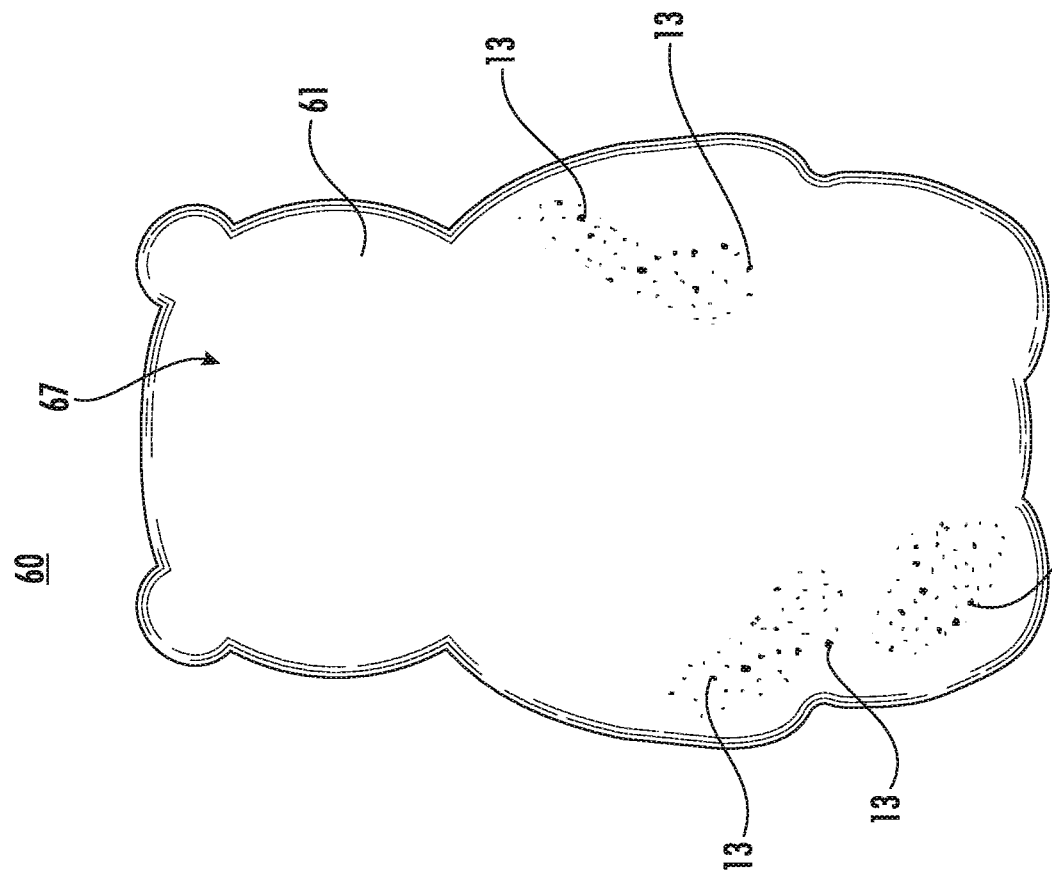
FIG. 8D is a rear view of the static discharge device of FIG. 8A.
Figure 8C:
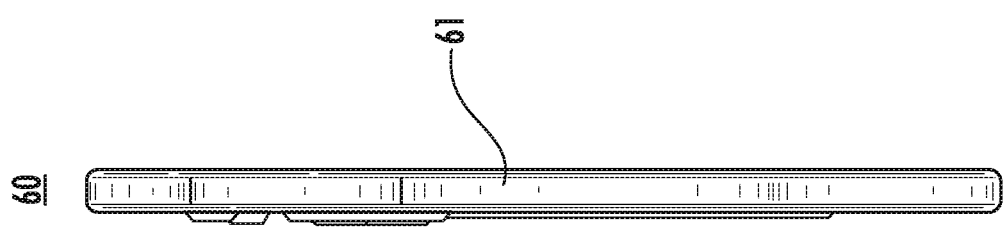
FIG. 8C is a side view of the static discharge device of FIG. 8A.

A method for removing static from one or materials comprises moving static discharge device 10 along surface 51 of one or more materials 52 by holding static discharge device 10 at a pre-determined distance D from one or more materials 52 to discharge static build up as shown in FIG. 7. The pre-determined distance D can be a distance at which a cracking or popping sound is heard as static is transferred to static discharge device 10. Static discharge device 10 can be moved up and down along material 52. For example material 52 can be fabric, clothing or hair. In this embodiment, static discharging device 10 can have any shape. Suitable shapes for static discharge device 10 include square, rectangle, polygon, oval, and circle. Handle 60 can be coupled or attached to static discharge device 10.

Alternatively, one or more of static discharge devices 20, 30 or 40 can be used in clothes dryer 50 before or after loading the one or more materials 52 into clothes dryer 50 and tumbling the one or more static discharging devices 10 with one or more materials 52 during a drying cycle of for removing static from one or materials by moving static discharge device 20, 30 or 40 along surface 51 of one or more materials 52.

FIGS. 8A-8D illustrate static discharge device 60 in accordance with the teachings of the present invention. Static discharge device 60 includes body 61. Body 61 can be formed of conductive thermoplastic material 12. In one embodiment, conductive thermoplastic material 12 comprises thermoplastic material 14 including conductor 13. Body 61 can have a decorative or animated shape. For example, body 61 can have a bear shape for appeal to children having clothes dried with static discharge device 60. Body 61 can include front surface 65 and rear surface 67. Front surface 65 and rear surface of body 12 can include head portion 66. Front surface 65 of portion head 66 can include indicia of a face.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed:

1. A static discharge dryer device comprising;
a body, said body having a disc or oval shape, said body having a streamlined shape, said body being formed of a conductive thermoplastic material, the conductive thermoplastic material comprising a polymer including a conductor, said body having a coating applied thereupon, the coating comprising a dielectric material wherein the shape of the body is configured to allow the static discharge dryer device to slide freely throughout one or more materials placed in a clothes dryer.

2. The static discharge dryer device of claim 1 wherein the polymer is polypropylene (PP).

3. The static discharge dryer device of claim 1 wherein the polymer is one or more materials selected from the group consisting of: polypropylene (PP); nylon; polycarbonate (PC); polystyrene (PS); styrene acrylonitrile (SAN); acrylonitrile butadiene styrene (ABS); high density polyethylene (HDPE); low density polyethylene (LDPE); acetal; polyacetal; polyoxymethylene (POM); polysulfone (PSU); polybutylene terephthalate (PBT); polyethylene terephthalate (PET); ester-based thermoplastic polyurethane elastomer (TPUR); ether-based thermoplastic polyurethane elastomer (TPUR); polyphenylene sulfide (PPS); polyethersulfone (PES); polyether-ester block copolymer thermoplastic Elastomer (TEEE:; modified polyphenylene oxide (PPO); acrylic; poly(methyl methacrylate) (PMMA); polycarbonate/acrylic alloy (PC/PMMA); polyetherimide (PEI); Polyolefin; polycarbonate/polyester (PC/PBT); polyetheretherketone (PEEK); polyetherketone (PEK); rigid thermoplastic polyurethane (RTPU); polycarbonate/ABS alloy (PC/ABS); styrenic block copolymer thermoplastic elastomer (SBC); thermoplastic vulcanizate (TPV); polymethylpentene (PMP); polyvinylidene fluoride (PVDF); fluorinated ethylene propylene (FEP); polyetherketoneetherketoneketone (PEKEKK); polyphthalamide (PPA); polyetherketoneketone (PEKK); thermoplastic polyimide (TPI); polysulfone/polycarbonate alloy (PSU/PC), high temperature nylon (HTN); polyketone (PK); syndiotactic polystyrene (SPS); thermoplastic polyolefin (TPO) and thermoplastic elastomer (TPE).

4. The static discharge dryer device of claim 1 wherein the conductor comprises metal particles or strands.

5. A static discharge dryer device comprising; a body, said body having a disc or oval shape, said body having a streamlined shape, said body being formed of a conductive thermoplastic material, the conductive thermoplastic material comprising a polymer including a conductor, wherein the conductor comprises stainless steel strands and wherein the shape of the body is configured to allow the static discharge device to slide freely throughout one or more materials placed in a clothes dryer.

6. The static discharge dryer device of claim 1 wherein the conductor comprises carbon or carbon fiber.

7. The static discharge dryer device of claim 1 wherein the conductive thermoplastic material comprises polypropylene and metal or carbon fibers.

8. A method for removing static from one or more materials comprising the steps of:
placing one or more static discharge devices in a clothes dryer before or after loading one or more materials into the clothes dryer, and
tumbling the one or more static discharge devices with the one or more materials in the clothes dryer,
wherein the more static discharge devices comprise a body, said body having a disc or oval shape, said body having a streamlined shape, wherein the shape of the body is configured to allow the static discharge device to slide freely throughout the one or more materials placed in the clothes dryer, said body being formed of a conductive thermoplastic material, said body having a coating applied thereupon, the coating comprising a dielectric material, wherein the conductive thermoplastic material comprises a polymer including a conductor, the conductor comprises carbon, carbon fiber or metal fibers or particles.

9. The method of claim 8 wherein the materials are fabrics or clothing.

10. The method of claim 8 wherein the polymer is one or more materials selected from the group consisting of: polypropylene (PP); nylon; polycarbonate (PC); polystyrene (PS); styrene acrylonitrile (SAN); acrylonitrile butadiene styrene (ABS); high density polyethylene (HDPE); low density polyethylene (LDPE); acetal; polyacetal; polyoxymethylene (POM); polysulfone (PSU); polybutylene terephthalate (PBT); polyethylene terephthalate (PET); ester-based thermoplastic polyurethane elastomer (TPUR); ether-based thermoplastic polyurethane elastomer (TPUR); polyphenylene sulfide (PPS); polyethersulfone (PES); polyether-ester block copolymer thermoplastic Elastomer (TEEE:; modified polyphenylene oxide (PPO); acrylic; poly(methyl methacrylate) (PMMA); polycarbonate/acrylic alloy (PC/PMMA); polyetherimide (PEI); Polyolefin; polycarbonate/polyester (PC/PBT); polyetheretherketone (PEEK); polyetherketone (PEK); rigid thermoplastic polyurethane (RTPU); polycarbonate/ABS alloy (PC/ABS); styrenic block copolymer thermoplastic elastomer (SBC); thermoplastic vulcanizate (TPV); polymethylpentene (PMP); polyvinylidene fluoride (PVDF); fluorinated ethylene propylene (FEP); polyetherketoneetherketoneketone (PEKEKK); polyphthalamide (PPA); polyetherketoneketone (PEKK); thermoplastic polyimide (TPI); polysulfone/polycarbonate alloy (PSU/PC), high temperature nylon (HTN); polyketone (PK); syndiotactic polystyrene (SPS); thermoplastic polyolefin (TPO) and thermoplastic elastomer (TPE).

11. The method of claim 8 wherein the conductive thermoplastic material comprises polypropylene and metal or carbon fibers.

12. A method for removing static from one or more materials comprising the step of:
moving a static discharge device over a surface of the one or more materials at a distance from the surface,
wherein the more static discharge device comprises a body, said body having a disc or oval shape, said body being formed of a conductive thermoplastic material, the conductive thermoplastic material comprises a polymer including a conductor, said body having a coating applied thereupon, the coating comprising a dielectric material, said body having a streamlined shape, wherein the shape of the body is configured to allow the static discharge device to slide freely over the one or more materials.

13. The method of claim 12 wherein the one or more materials are fabric, clothing or hair.

14. A method for manufacturing a static discharge device comprising the steps of:
a. blending a conductor into a polymer to form a conductive thermoplastic material;
b. shaping the conductive thermoplastic material by extrusion or injection molding into the static discharge device, the static discharge device is shaped into a disc or oval shape, said body having a streamlined shape, wherein the shape of the body is configured to allow the static discharge device to slide freely over one or more materials; and
c. applying a coating comprising a dielectric material to the conductive thermoplastic material.

15. A static discharge dryer device comprising; a body, said body having a disc or oval shape, said body having a streamlined shape, said body being formed of a conductive thermoplastic material, the conductive thermoplastic material comprising a polymer including a conductor, wherein said body has a thickness in the range of ¼ to ½ inch and wherein the shape of the body is configured to allow the static discharge dryer device to slide freely over one or more materials.

16. The static discharge dryer device of claim 15 wherein a coating is applied to the body.

17. The static discharge dryer device of claim 16 wherein said coating comprises a nonconductive material.

18. The static discharge dryer device of claim 16 wherein said coating comprises a conductive material.

19. The static discharge dryer device of claim 16 wherein said coating comprises a dielectric material.

* * * * *